(12) United States Patent
Abramson

(10) Patent No.: US 9,399,887 B2
(45) Date of Patent: Jul. 26, 2016

(54) WEATHERSTRIPPING

(71) Applicant: Steven Robert Abramson, Victor, NY (US)

(72) Inventor: Steven Robert Abramson, Victor, NY (US)

(73) Assignee: GREENSTAR TECHNOLOGIES LLC, Victor, NY (US)

( * ) Notice: Subject to any disclaimer, the term of this patent is extended or adjusted under 35 U.S.C. 154(b) by 316 days.

(21) Appl. No.: 14/215,427

(22) Filed: Mar. 17, 2014

(65) Prior Publication Data

US 2014/0199512 A1    Jul. 17, 2014

Related U.S. Application Data

(63) Continuation-in-part of application No. 12/832,959, filed on Jul. 8, 2010, now Pat. No. 8,673,424.

(51) Int. Cl.
| | | |
|---|---|---|
| *E06B 7/16* | (2006.01) | |
| *E06B 7/22* | (2006.01) | |
| *B32B 3/26* | (2006.01) | |
| *B32B 3/30* | (2006.01) | |

(52) U.S. Cl.
CPC . *E06B 7/22* (2013.01); *B32B 3/263* (2013.01); *B32B 3/30* (2013.01); *B32B 2419/00* (2013.01); *B32B 2605/00* (2013.01); *Y10T 29/49826* (2015.01); *Y10T 428/23979* (2015.04); *Y10T 428/24612* (2015.01)

(58) Field of Classification Search
CPC ......... E06B 7/16; E06B 7/22; E05Y 2900/55; B32B 3/263; B32B 3/30; B32B 2419/00; B32B 2605/00

USPC ............ 428/95, 172, 81, 82; 49/475.1, 489.1, 49/506; 29/428

See application file for complete search history.

(56) References Cited

U.S. PATENT DOCUMENTS

| 2,613,408 | A | 10/1952 | Bailey |
|---|---|---|---|
| 3,175,256 | A | 3/1965 | Horton |
| 3,690,038 | A | 9/1972 | Dieterich |
| 4,064,654 | A | 12/1977 | Olson |
| 4,246,304 | A | 1/1981 | Dixon |
| 4,458,450 | A | 7/1984 | Young et al. |

(Continued)

FOREIGN PATENT DOCUMENTS

| EP | 0081288 A1 | 6/1983 |
|---|---|---|
| EP | 0289568 A1 | 11/1988 |

(Continued)

OTHER PUBLICATIONS

English language abstract and machine-assisted English translation for WO 2009/155940 extracted from the espacenet.com database on Mar. 27, 2014, total of 11 pages.

*Primary Examiner* — Cheryl Juska

(57) ABSTRACT

A weatherstripping for use with a frame having at least one channel comprises a backing and a weatherstripping material coupled to the backing. The backing has a front surface, a bottom surface opposite the front surface, a first side edge, a second side edge opposite the first side edge, a central support defining a central axis, and a plurality of alternating tabs extending from the central support to the first side edge to define notched out spaces between the alternating tabs. The second side edge defines a plane that is parallel to the central axis of the central support. The weatherstripping material, which is coupled to the backing, extends from the front surface of the backing.

19 Claims, 11 Drawing Sheets

(56) References Cited

U.S. PATENT DOCUMENTS

| | | |
|---|---|---|
| 4,970,829 A | 11/1990 | Brautigam |
| 5,095,658 A | 3/1992 | Anderhalden |
| 5,107,622 A | 4/1992 | Fuchs et al. |
| 5,253,457 A | 10/1993 | Orth |
| 5,287,656 A | 2/1994 | Johnson |
| 5,384,976 A | 1/1995 | Hall |
| 5,438,802 A | 8/1995 | Johnson |
| 6,128,859 A | 10/2000 | Vance |
| 6,321,490 B1 | 11/2001 | Vance |
| 6,341,449 B1 | 1/2002 | Stahl |
| 6,530,190 B2 | 3/2003 | Conachen |
| 7,335,412 B2 | 2/2008 | Wylie |
| 2002/0194810 A1 | 12/2002 | Conachen |
| 2004/0074719 A1 | 4/2004 | Loughney |
| 2010/0252168 A1 | 10/2010 | Pawson et al. |

FOREIGN PATENT DOCUMENTS

| | | |
|---|---|---|
| TW | 564282 B | 12/2003 |
| WO | WO8803588 A1 | 5/1988 |
| WO | WO03100151 A1 | 12/2003 |
| WO | WO2007149088 A1 | 12/2007 |
| WO | WO2009155940 A1 | 12/2009 |

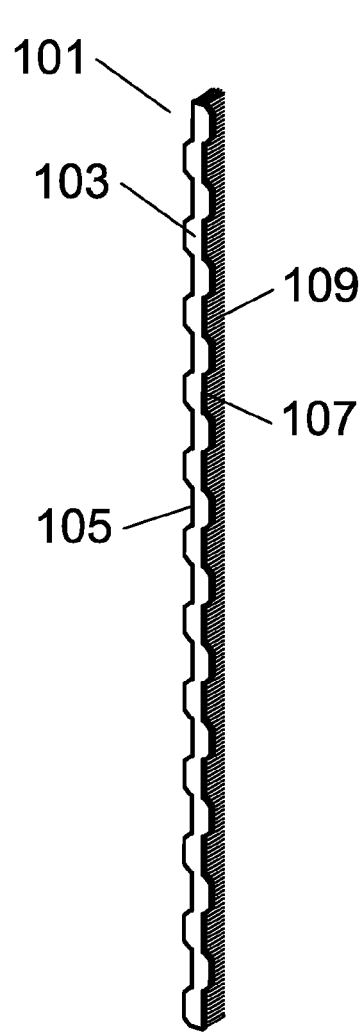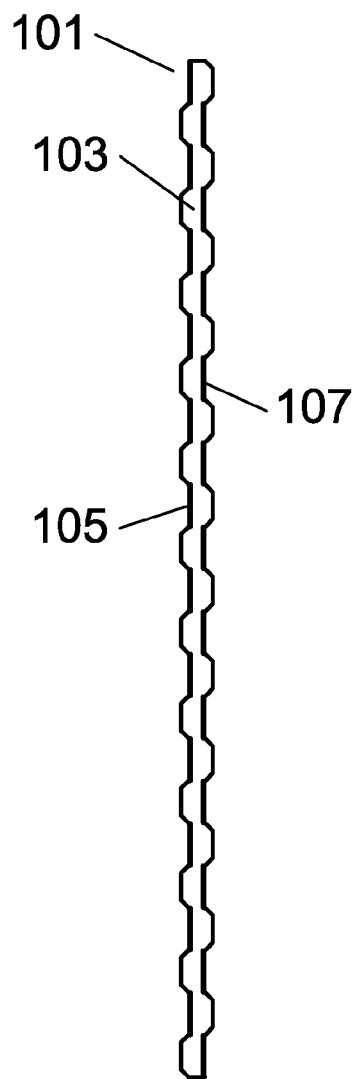
Fig. 1
Fig. 2
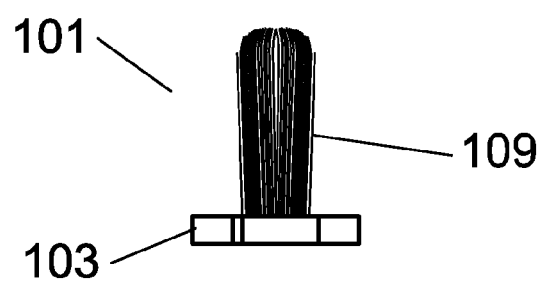
Fig. 3

US 9,399,887 B2

WEATHERSTRIPPING

CROSS REFERENCE TO RELATED APPLICATIONS

The subject application is a continuation-in-part of U.S. patent application Ser. No. 12/832,959, filed on Jul. 8, 2010, the contents of which are expressly incorporated herein in their entirety.

FIELD OF THE INVENTION

This application relates generally to a weatherstripping that eases the installation and replacement of weatherstripping for windows, doors, and other members.

BACKGROUND

Weatherstripping is commonly used to seal windows, doors, and similar structures from air, moisture, sound, mold, dust, pest infiltration and/or the like. Weatherstripping typically creates a barrier, and typically forms and/or adjusts sufficiently to allow the window or door to open and close properly. There are many types of weatherstripping on the market, including brass or metal strips, felt strips, blown rubber and extruded rubber strips, and brush or pile strips.

Brush weatherstripping is commonplace, and includes a pile made of polypropylene or other similar fibrous material. Oftentimes brush weatherstripping has a backing that can be inserted in a slot that traverses either the perimeter of a fenestration, or the door or window placed in the fenestration. The slot may be a T-shaped channel that accommodates the backing of the weatherstripping. The weatherstripping backing is commonly pushed longitudinally into the channel where the weatherstripping is held in place. As more of the weatherstripping length is inserted into the channel and pushed along longitudinally for placement, friction increases and it becomes progressively harder to push longer pieces of weatherstripping into the channel. When a window, door or similar structure is produced, this may not represent a hardship, as automation equipment may be employed to place the weatherstripping into the channel. Unfortunately, weatherstripping does not last forever, and eventually requires replacement. When the time comes to replace the weatherstripping, it is often difficult to place new weatherstripping into the existing channel of the window or door assembly. For instance, the channel may have deformed ever so slightly over time, or may contain dirt and debris that interfere with the smooth sliding of the weatherstripping into the channel. Further, the previous weatherstripping may have been so far deteriorated that removal of the previous weatherstripping may have left fragments behind in the channel. All of these difficulties make the replacement of the weatherstripping an unsavory and sometimes problematic undertaking.

What is needed is a weatherstripping that does not rely on the longitudinal insertion of the weatherstripping backing into a channel.

SUMMARY

A weatherstripping for use with a frame having at least one channel comprises a backing and a weatherstripping material coupled to the backing. The backing has a front surface, a bottom surface opposite the front surface, a first side edge, a second side edge opposite the first side edge, a central support defining a central axis, and a plurality of alternating tabs extending from the central support to the first side edge to define notched out spaces between the alternating tabs. The second side edge defines a plane that is parallel to the central axis of the central support. The weatherstripping material is coupled to the backing and extends from the front surface of the backing.

BRIEF DESCRIPTION OF THE DRAWINGS

Advantages of the present disclosure will be readily appreciated as the same becomes better understood by reference to the following detailed description when considered in connection with the accompanying drawings. It is to be understood that the drawings are illustrative, and are not necessarily drawn to scale.

FIG. 1 is a perspective view of a back side of an embodiment of a weatherstripping.

FIG. 2 is a plan view of the back side of the weatherstripping of FIG. 1.

FIG. 3 is an end view of the weatherstripping of FIG. 1.

The present invention will be described in connection with several preferred embodiments; however, it will be understood that there is no intent to limit the invention to the embodiments described. On the contrary, the intent is to cover all alternatives, modifications, and equivalents as may be included within the spirit and scope of the invention as defined by this specification, claims, and the attached drawings.

DETAILED DESCRIPTION

Figure 6:
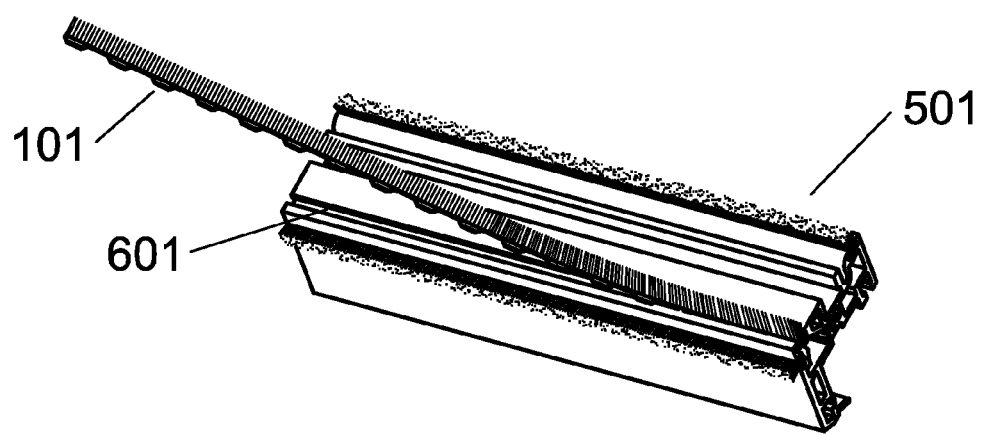
FIG. 6 depicts the weatherstripping of FIG. 1 being installed in the extruded frame.
Figure 7:
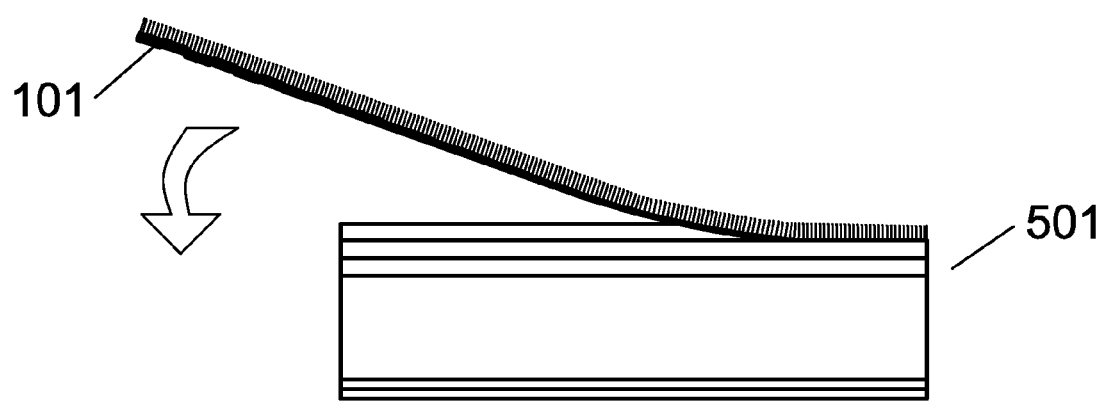
FIG. 7 further depicts the weatherstripping of FIG. 1 being installed in the extruded frame.
Figure 8:
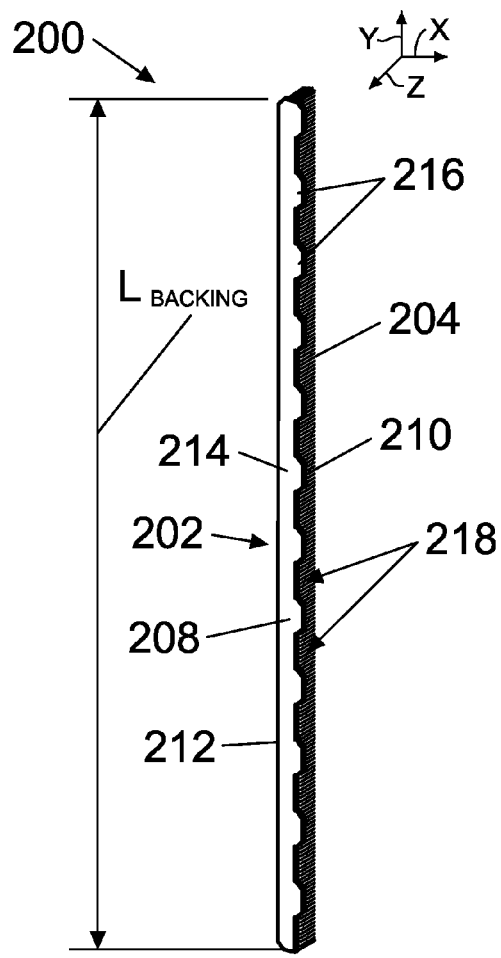
FIG. 8 is a perspective view of another embodiment of the weatherstripping.
Figure 9:
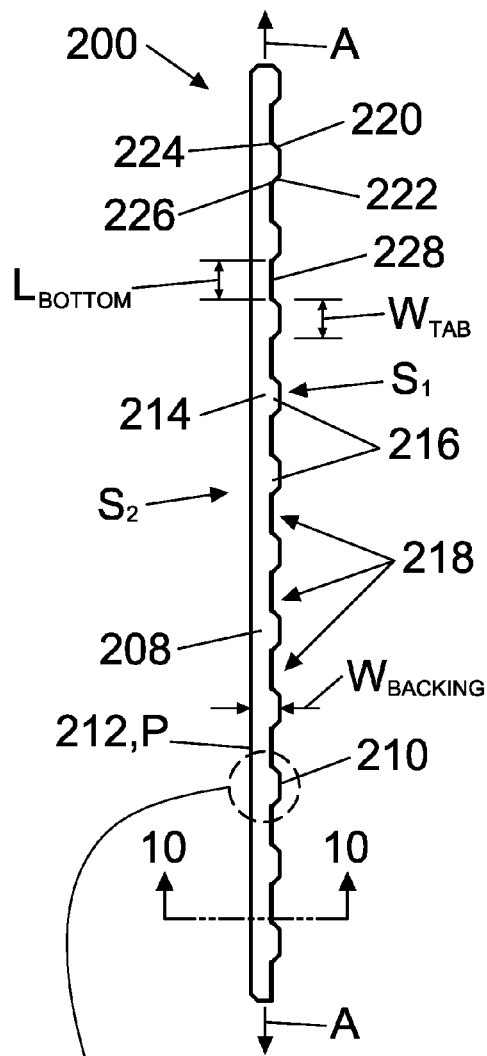
FIG. 9 is a plan view of a back side of the weatherstripping of FIG. 8.
Figure 10:
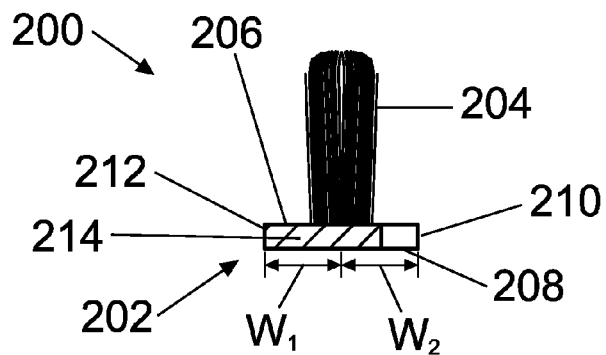
FIG. 10 is a cross-sectional view of the weatherstripping of FIG. 8 taken along line 10-10 in FIG. 9.
Figure 9A:
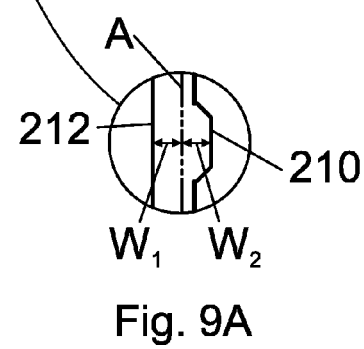
FIG. 9A is an enlarged portion of the weatherstripping shown in FIG. 9.
Figure 11:
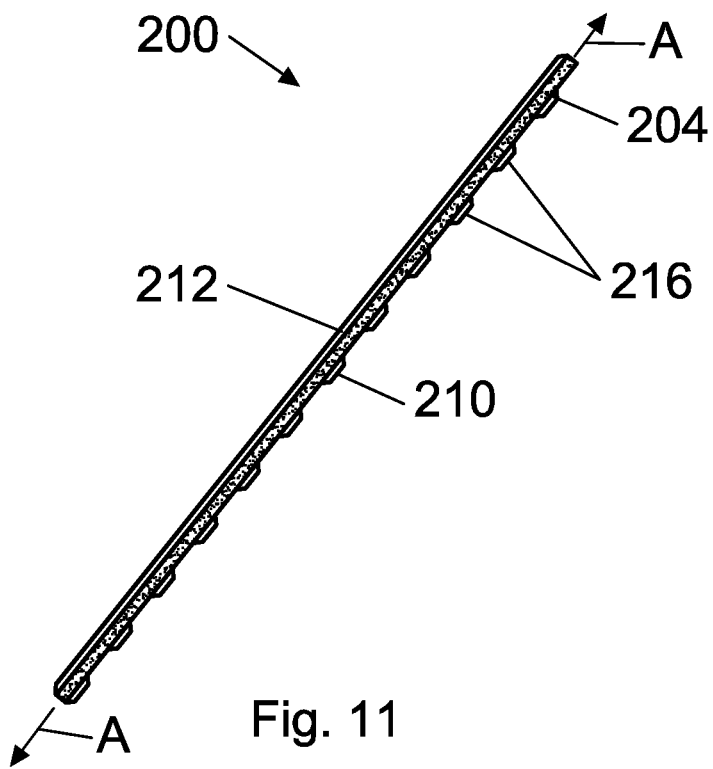
FIG. 11 is a plan view of a front side of the weatherstripping of FIG. 8.
Figure 12:
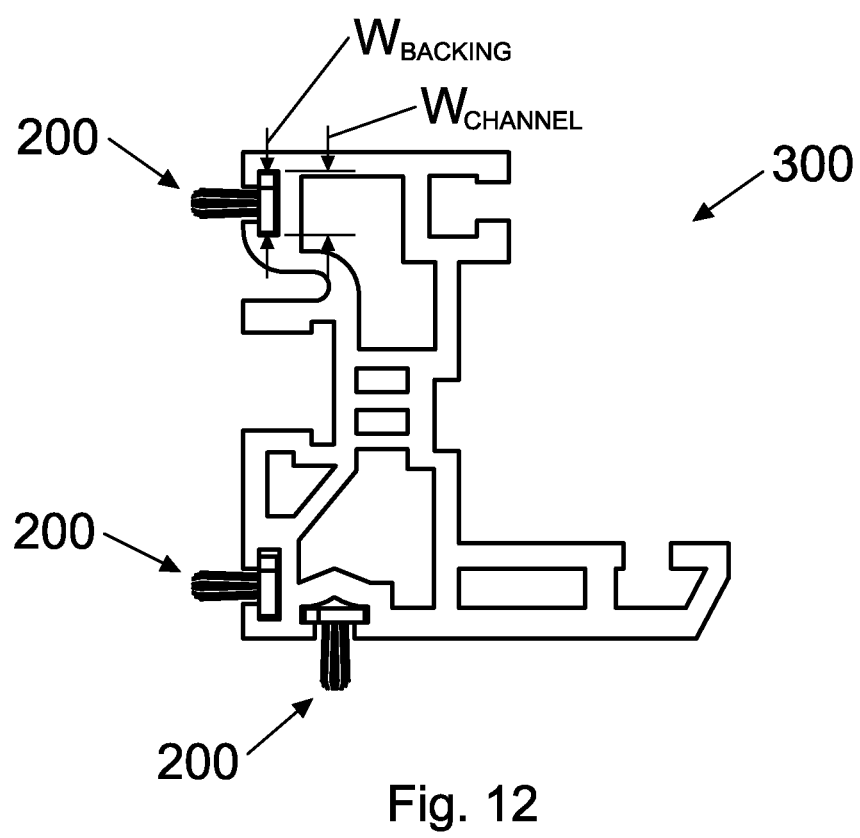
FIG. 12 is an end view of a fragment of a frame defining a plurality of channels and the weatherstripping of FIG. 8 installed in each of the channels.

Referring now to the figures, an embodiment of the weatherstripping 101 is shown and described with reference to FIGS. 1-4. An exemplary installation of the weatherstripping 101 is shown and described with reference to FIG. 5. Further, FIGS. 6 and 7 depict the weatherstripping 101 being installed in an extruded frame for a window or door.

Weatherstripping commonly contains a backing and a weatherstripping material such as pile fibers, a plush material, closed cell foam, metal, vinyl, foam rubber, felt, silicone, and other natural and manmade materials. The present invention and the various embodiments depicted and envisioned herein are not limited to a specific type of weatherstripping material, but rather, the backing of the present invention may be adapted to many materials and still be within the spirit and broad scope of the present invention as described herein.

FIG. 1 is a perspective view of the back side of the weatherstripping 101 of the present invention. Depicted is a backing 103 that may be made from a plastic or similar material. Suitable plastics include, but are not limited to, polypropylene, nylon, and the like. The backing is a strip of material that is formed by conventional means such as, in the case of a plastic, cut from sheet stock, extruded, or the like. Suitable backing widths include, but are not limited to 0.155 inches, 0.187 inches, 0.229 inches, 0.250 inches, 0.270 inches, 0.300 inches, or similar standard widths that will allow for ease of manufacturing as well as convenient replacement of old weatherstripping. Formed in the backing 103 is a notched out space 105 and an alternate notched out space 107. Such an arrangement is made by techniques known to those skilled in the art, and may include mechanical cutting, laser cutting, stamping, heat processing, injection molding, and the like. The notched out space may be rectangular in shape, or may be angled. For example, an angle of 135 degrees provides good performance when snapping the weatherstripping of the present invention into a slot or T-channel. The present invention is not limited to a specific angular arrangement, and may vary based on material, application, temperature and climate conditions, and the like. In addition, the two angles that make up the notched out space 105 and the alternate notched out space 107 are not necessarily the same angle, but may be in sonic embodiments. In addition, while the notched out space 105 and alternate notched out space 107 comprise a repeating pattern, the pattern need not be entirely symmetrical or of the same spacing, although in some embodiments of the present invention the repeating pattern is in fact symmetrical and of the same spacing.

Further depicted in FIG. 1 are pile fibers 109 that are an exemplary material that may be used to affix to the backing 103 to provide a suitable weather barrier. The pile fibers 109 may be made from polypropylene, polyester, nylon, or the like. As stated previously, other weatherstripping materials may also be used. The pile fibers 109 are commonly made as a yarn of synthetic material, but may also be made from natural materials such as plant and animal fibers, or the like. The weatherstripping material such as the pile fibers 109 are attached to the backing 103 through techniques such as adhesive bonding, ultrasonic welding, heat bonding, or mechanical bonding using means such as a retaining structure affixed to or made a part of the backing 103. Such retaining structures may include, but are not limited to, longitudinal strips or a longitudinal channel, pressure fit slots, and the like. U.S. Pat. No. 3,175,256 to Horton entitled "Weather Strip" discloses an early pile weatherstripping. U.S. Pat. No. 3,690,038 to Dieterich entitled "Recessed Weather Strip Body" further discloses a channelized weatherstripping. The entire disclosure of each of these patents being incorporated herein by reference.

Further depicted in FIG. 1 are pile fibers 109 that are an exemplary material that may be used to affix to the backing 103 to provide a suitable weather barrier. The pile fibers 109 may be made from polypropylene, polyester, nylon, or the like. As stated previously, other weatherstripping materials may also be used. The pile fibers 109 are commonly made as a yarn of synthetic material, but may also be made from natural materials such as plant and animal fibers, or the like. The weatherstripping material such as the pile fibers 109 are attached to the backing 103 through techniques such as adhesive bonding, ultrasonic welding, heat bonding, or mechanical bonding using means such as a retaining structure affixed to or made a part of the backing 103. Such retaining structures may include, but are not limited to, longitudinal strips or a longitudinal channel, pressure fit slots, and the like. U.S. Pat. No. 3,175,256 to Horton entitled "Weather Strip" discloses an early pile weatherstripping. U.S. Pat. No. 3,690,038 to Dieterich entitled "Recessed Weather Strip Body" further discloses a channelized weatherstripping. The entire disclosure of each of these patents being incorporated herein by reference.

FIG. 2 shows a plan view of the back side of the weatherstripping. The segmented notched design depicted allows the weatherstripping material, such as a polypropylene pile backing, to be flexible enough to snap into the throat of a slot or similar channel thus allowing the weatherstripping of the present invention to have a zipper snap in effect as it is rolled into place during installation. A screen spline tool or pizza cutter like tool may be useful for installation. The novel configuration of the backing with the alternating notched out spaces allows for ease of installation and further is more forgiving should tolerances be off in a channel or t slot. The width of the notched out space 105 and alternate notched out space 107 may be, by way of example and not limitation, 0.125 inch, 0.250 inch, or the like.

FIG. 3 is an end view of the weatherstripping 101 of the present invention. In FIG. 3, the backing 103 can be seen with pile fibers 109 terminating on the backing 103. The termination of the pile fibers may be by way of adhesive bonding, ultrasonic welding, mechanical fastening, heat bonding, and the like. In some embodiments, additional structure may be added to the backing 103 to facilitate fastening of the weatherstripping material such as pile fibers 109. Such structures may include longitudinal strips, channels, clips, or similar structures known to those skilled in the art.

Figure 4:
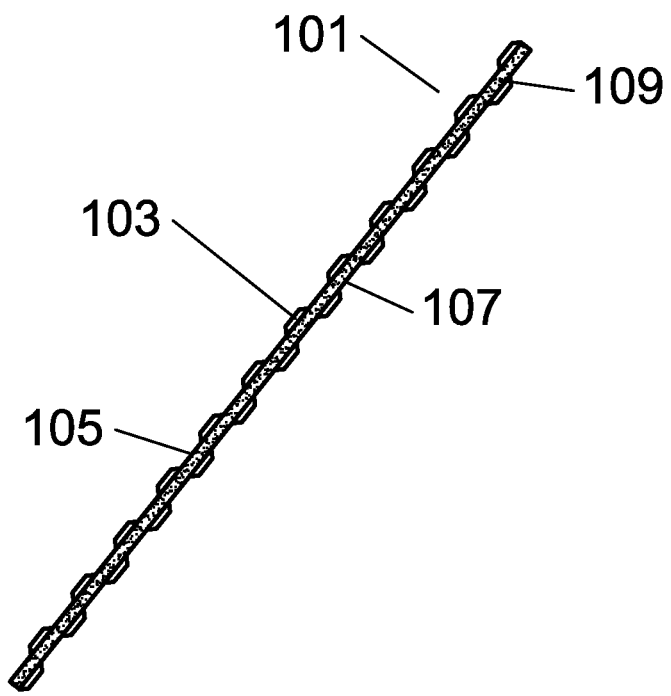
FIG. 4 is an upward plan view of the weatherstripping of FIG. 1.

FIG. 4 is an upward plan view of the weatherstripping 101 showing pile fibers 109. Other embodiments of the present invention may incorporate other forms of weatherstripping material.

Figure 5:
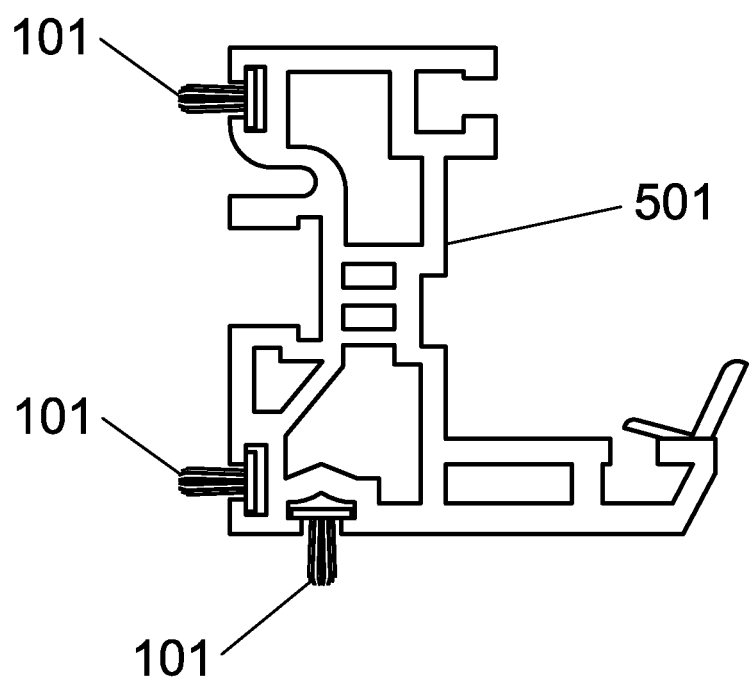
FIG. 5 is a cross sectional view of a typical installation of the weatherstripping of FIG. 1 in an exemplary extruded frame.

FIG. 5 is a cross sectional view of a typical installation of the weatherstripping in an exemplary extruded frame 501. The extruded frame may be a vinyl, PVC, or a similar plastic. FIG. 5 depicts three weatherstripping pieces (101); other frames may have more or less. The frame may also be made from other materials such as wood, aluminum, or the like. As depicted in FIG. 5, the weatherstripping 101 is positioned within a T channel and retained in place through the structure of the channel combined with the geometry and frictional characteristics of the weatherstripping 101.

Installation of the weatherstripping involves pushing down on the weatherstripping structure while snapping the weatherstripping into the channel or T slot as opposed to pushing it longitudinally into the channel or T slot. This makes for a much easier installation over other channelized weatherstripping products in the replacement market. The notched out areas make the weatherstripping flexible, yet enough material is left to maintain overall strength of the weatherstripping to allow for long term structural placement of the replacement part. FIG. 6 depicts the weatherstripping 101 being installed in an exemplary extruded frame 501. As can be seen in FIG. 6, the weatherstripping 101 is being inserted into a channel 601 or T slot through a side to side motion. FIG. 7 shows another view of the weatherstripping 101 being installed in an extrusion 501. As the weatherstripping 101 is installed in the channel 601, a thin roller tool such as a screen spline tool or a pizza cutter type tool may be rolled along the length of the weatherstripping 101 to facilitate installation with a zipper like snap in effect. The structure of the weatherstripping and the ease of installation allow for easy retrofit, and accommodates tolerance variations as well as dirty, distorted, or otherwise problematic channels or T slots.

Another embodiment of the weatherstripping 200 is shown and described below with reference to FIGS. 8-20. As shown, the weatherstripping 200 comprises a backing 202 and a weatherstripping material 204 coupled to the backing 202.

The backing 202 has a front surface 206, a bottom surface 208 opposite the front surface 206, a first side edge 210, a second side edge 212 opposite the first side edge 210, and a central support 214 defining a central axis A. As shown, the backing 202 may be formed into a strip, and has a backing length $L_{BACKING}$. While the backing 202 may have any desirable backing length $L_{BACKING}$, the backing length $L_{BACKING}$ is typically substantially the same as the channel length $L_{CHANNEL}$ of a channel 304 defined in a frame 302. As will be described in detail below, the backing 202 is inserted within the channel 304 of the frame 302. As used herein, the backing length $L_{BACKING}$ being substantially the same as the channel length $L_{CHANNEL}$ means that the backing length $L_{BACKING}$ may be exactly the same as the channel length $L_{CHANNEL}$, or the backing length $L_{BACKING}$ may be close to but not exactly the same as the channel length $L_{CHANNEL}$. In an example, the backing length $L_{BACKING}$ is substantially the same as the channel length $L_{CHANNEL}$ when the backing length $L_{BACKING}$ is at least 98% of the channel length $L_{CHANNEL}$.

Additionally, the backing 202 may have any desirable backing width $W_{BACKING}$ which extends from the first side edge 210 to the second side edge 212. Typically, the backing width $W_{BACKING}$ is substantially the same as the channel width $W_{CHANNEL}$ of the channel 304. As used herein, the backing width $W_{BACKING}$ being substantially the same as the channel width $W_{CHANNEL}$ means that the backing width $W_{BACKING}$ may be exactly the same as the channel width $W_{CHANNEL}$, or the backing width $W_{BACKING}$ may be close to but not exactly the same as the channel width $W_{CHANNEL}$. In an example, the backing width $W_{BACKING}$ is substantially the same as the channel width $W_{CHANNEL}$ when the backing width $W_{BACKING}$ is at least 98% of the channel width $W_{CHANNEL}$. In an example, the backing width $W_{BACKING}$ may also be any standard width, such as a width of from about 0.155 to 0.300 inches. In other examples, the backing width $W_{BACKING}$ may have a standard width of about 0.155 inches, about 0.187 inches, about 0.250 inches, about 0.270 inches, about 0.300 inches, or another suitable standard width. With these standard widths, the backing 102 may be easily manufactured and/or replaced. It is to be understood, however, that the backing 202 may have a non-standard backing width $W_{BACKING}$. In these instances, the backing 202 may be custom made to have any backing width $W_{BACKING}$.

Typically, the backing width $W_{BACKING}$ is the sum of a first width $W_1$ (which extends from the central axis A to the second side edge 212) and a second width $W_2$ (which extends from the central axis A to the first side edge 210). In an example, the first and second widths $W_1$, $W_2$ are substantially equal. As used herein, the widths $W_1$ and $W_2$ being substantially equal means that the widths $W_1$ and $W_2$ may be exactly equal, or the width $W_1$ may be close to but not exactly equal to the width $W_2$. In an example, the widths $W_1$ and $W_2$ are substantially equal when there is less than a 2% difference between the widths $W_1$ and $W_2$. Additionally, and in another example, the first and second widths $W_1$, $W_2$ are consistent along the backing length $L_{BACKING}$ of the backing 202.

The backing 202 further comprises a plurality of alternating tabs 216 extending from the central support 214 to the first side edge 210 to define notched out spaces 218 between the alternating tabs 216. Additionally, the second side edge 212 of the backing 202 defines a plane P that is parallel to the central axis A of the central support 214. With this configuration, and as shown, the backing 202 has alternating tabs 216 distributed along a first side $S_1$ of the backing 202 and no tabs 216 distributed along a second side $S_2$ of the backing 202. Typically, the backing 202 comprises alternating tabs 216 extending from the central support 214 to the first side edge 210 along at least a portion of the backing length $L_{BACKING}$. As shown, the alternating tabs 216 extend from the central support 214 to the first side edge 210 along the entire backing length $L_{BACKING}$.

The alternating tabs 216 may have any desirable shape, such as rounded shapes, rectangular shapes, trapezoidal shapes, etc. As shown, each of the alternating tabs 216 has a trapezoidal shape with first 220 and second 222 sloped sides with respective first 224 and second 226 ends coupled to the central support 214. In an example, the first 224 and second 226 ends are integrally, mechanically, and/or metallurgically coupled to the central support 214. Each of the alternating tabs 216 also has a tab width $W_{TAB}$ extending between the first 220 and second 222 sloped sides. Typically, and as shown, the tab width $W_{TAB}$ of each of the alternating tabs 216 is consistent along the backing length $L_{BACKING}$.

The notched out spaces 218 may be formed utilizing any suitable technique, such as by mechanical cutting, laser cutting, stamping, heat processing, injection molding, and the like. Each of the notched out spaces 218 is generally defined by the central support 214, the first sloped side 220 of one of the adjacent tabs 216, and the second sloped side 222 of an adjacent one of the alternating tabs 216. Each notched out space 218 further has a bottom edge 228 defined between the first end 224 of the first side 220 of one of the alternating tabs 216 and the second end 226 of the second side 222 of an adjacent one of the alternating tabs 216. Typically, the first side 220 of an alternating tab 216 and the bottom edge 228 of an adjacent notched out space 218 forms a first predefined angle, and the second side 222 of an alternating tab 216 and the bottom edge 228 of an adjacent notched out space 218 forms a second predefined angle. In an example, the first and second predefined angles are first and second predefined obtuse angles, such as angles of from greater than 90 degrees to less than 180 degrees. In an example, the first and second predefined angles are each about 135 degrees. As previously mentioned, at an angle of about 135 degrees, the weatherstripping 200 performs well during installation where the tabs 216 can easily snap into the channel 304 of the frame 302. In another example, the first and second angles are each about 90 degrees, and the first side 220, the second side 222, and the bottom edge 228 define a rectangular notched out space 218. Typically, the first and second angles are the same. It is to be understood, however, that the first and second angles do not have to be the same angle, and instead the first angle may be different from the second angle.

The bottom edge 228 of each of the notched out spaces 218 has a bottom length $L_{BOTTOM}$. In an example, and as shown, the bottom length $L_{BOTTOM}$ of the notched out spaces 218 is consistent along the backing length $L_{BACKING}$. With this configuration, the alternating tabs 218 are evenly spaced along the backing length $L_{BACKING}$. Additionally, the bottom length $L_{BOTTOM}$ is a measure of the width of the notched out spaces 218. The width of the notched out spaces 218 (i.e., the bottom length $L_{BOTTOM}$) may be, for example, from about 0.125 to 0.250 inches. In another example, the width of the notched out spaces 218 may be 0.125 inches, 0.250 inches, etc.

In an example, the backing 202 may comprise or be made of any suitable polymer, such as a thermoplastic material. Non-limiting examples of suitable thermoplastic materials include polypropylene, nylon, and combinations thereof.

The weatherstripping material 204, which is coupled to the backing 202, extends from the front surface 206 of the backing 202. As previously mentioned, the weatherstripping material 204 may comprise, but is not limited to, a pile of fibers, a plush material, a closed cell foam, a metal, a vinyl, a foam rubber, a felt, a silicone, and other natural or manmade materials. As shown, the weatherstripping material 204 is a pile of fibers coupled, affixed, or attached to the backing 202. The pile of fibers may comprise or be made from polypropylene, polyester, nylon, or other suitable materials. In one example, the weatherstripping material 204 is a pile of fibers comprising polypropylene. The weatherstripping material 204 (such as the pile of fibers) may be coupled to the backing 202 by adhesive bonding, ultrasonic welding, heat bonding, mechanical bonding, and/or another suitable technique. In some instances, the backing 202 may include an additional component (such as additional channels, clips, and/or the like) to facilitate coupling of the weatherstripping material 204 to the backing 202.

As previously mentioned, the frame 302 defines at least one channel 304. The backing 202 (which has the weatherstripping material 204 extending from the front surface 206 of the backing 202) is inserted within the channel 304. In an example, the frame 302, the backing 202 inserted within the channel 304 of the frame 302, and the weatherstripping material 204 coupled to the backing 202 and extending from the front surface 206 of the backing 202 forms an assembly 300.

The frame 302 may have a number of different configurations, shapes, and/or designs depending, at least in part, on where or how the frame 302 is used. For instance, the frame 302 may be configured, shaped, and/or designed for use as a door frame for a car door, as a window frame for a car window, as a windshield frame for a windshield of a car, etc. As shown, an example of the frame 302 is formed from a plastic material which is extruded, molded, and/or the like. Further, the frame 302 comprises a plurality of channels 304 and each of a plurality of backings 202 is inserted within a respective one of the channels 304. Said differently, the frame 302 comprises a plurality of channels 304 with a backing 202 including the weatherstripping material 204 inserted within each channel 304. As shown, the frame 302 comprises three channels 304 and three weatherstrippings 200 where the backing 202 of one of the weatherstripping 200 is inserted within a respective one of the channels 304. It is to be understood, however, that the frame 302 may have any number of channels 304, such as one channel 304, two channels 304, three channels 304, four channels 304, etc.

Each of the channels 304 may have any desirable shape, such as a rectangular shape, a rounded shape, a trapezoidal shape, etc. As shown, the channels 304 have a rectangular shape. The channels 304 further have an opening 306 defined between first 308 and second 310 lips, and the opening 306 extends along the channel length $L_{CHANNEL}$. As will be described in further detail below, the backing 202 of the weatherstripping 200 is installed in the channel 304 through the opening 306. Additionally, the size of the channels 304 is such that the backing 202 can snugly fit inside the channel 202. Accordingly, there is very little tolerance between the backing 202 and the channel 304 walls. Additionally, when installed, the first 210 and second 212 side edges of the backing 202 are substantially straight when the backing 202 is inserted within the channel 304. As used herein, the first 210 and second 212 side edges are substantially straight means that the first 210 and second 212 side edges may be exactly straight, or may be close to but not exactly straight. In an example, the first 210 and second 212 side edges are substantially straight when the first 210 and second 212 side edges are straight within a 2% error.

An example of a method of installing the weatherstripping 200 into the frame 302 will now be described with reference to FIGS. 8 and 13-20. It is to be understood that the weatherstripping 200 (again, which is the backing 202 with the weatherstripping material 204 coupled to the backing 202) is flexible at least in the x- and z-directions. With flexibility in the z-direction, the weatherstripping 200 may be rolled up for purposes of packaging, shipping, etc., and may be unrolled prior to or during installation of the weatherstripping 200 into the frame 302. With flexibility in the x-direction, the weatherstripping 200 can also be twisted about the central support 214, which is useful during installation of the weatherstripping 200 in the frame 302.

Figure 13:
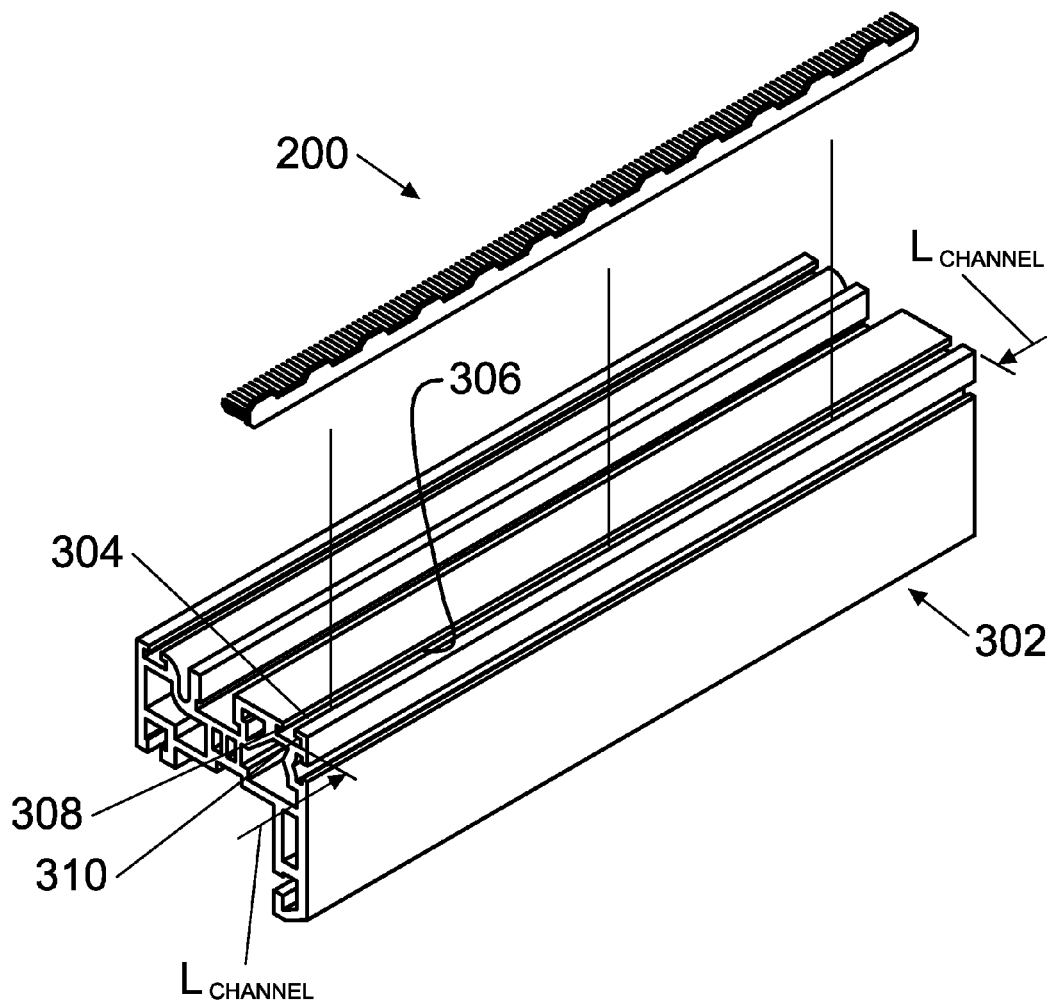
FIG. 13 is a perspective view of the frame and the weatherstripping of FIG. 8 aligned with one of the channels of the frame.

The method of installing the weatherstripping 200 includes aligning the second side edge 212 of the backing 202 with the channel 304 of the frame 302 along the central axis A. This method step is illustrated in FIG. 13. In an example, a piece of weatherstripping 200 may be cut from a supply of weatherstripping 200 (which may be provided as a roll of weatherstripping 200). The piece of weatherstripping 200 may be cut to a length that is at least as long as the channel length $L_{CHANNEL}$. At least a portion of the weatherstripping 200 is positioned above the channel 304 with the second side edge 212 aligned with the opening 306 that extends along the channel 304.

Figure 14:
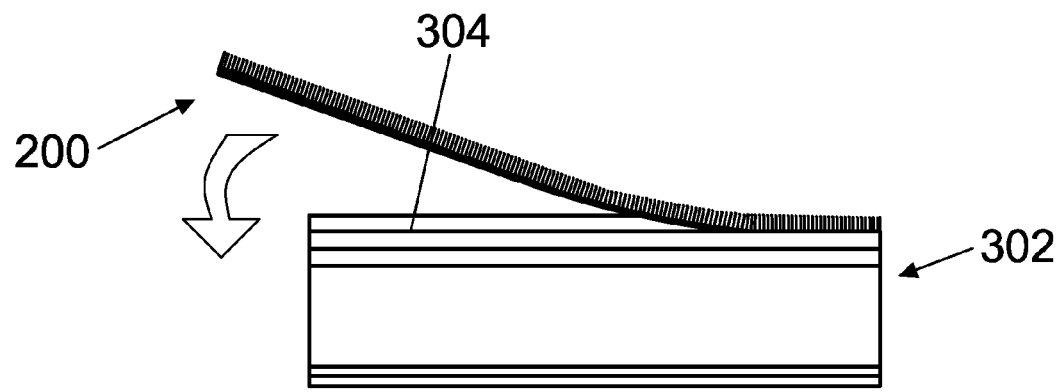
FIG. 14 is a side view of the frame with the weatherstripping of FIG. 8 partially installed in one of the channels.
Figure 15:
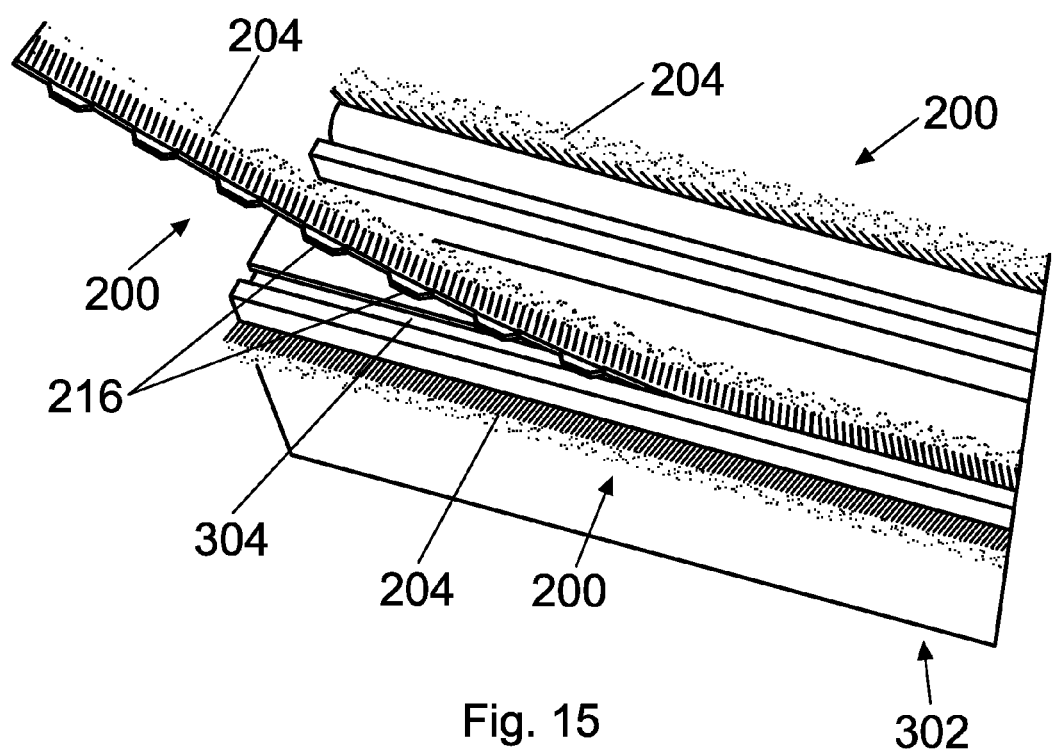
FIG. 15 is a perspective view of the frame defining three channels with the weatherstripping of FIG. 8 partially installed in one of the channels, and the weatherstripping of FIG. 8 entirely installed in each of the other channels.
Figure 16:
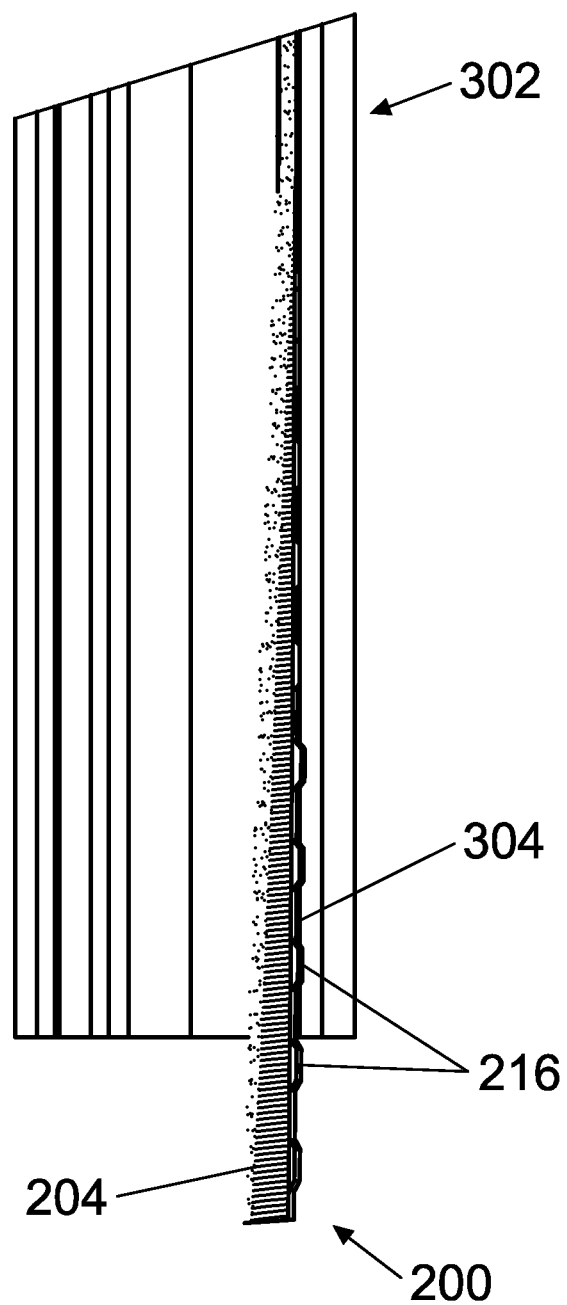
FIG. 16 is a plan view of the frame defining a plurality of channels with the weatherstripping of FIG. 8 partially installed in one of the channels.
Figure 17:
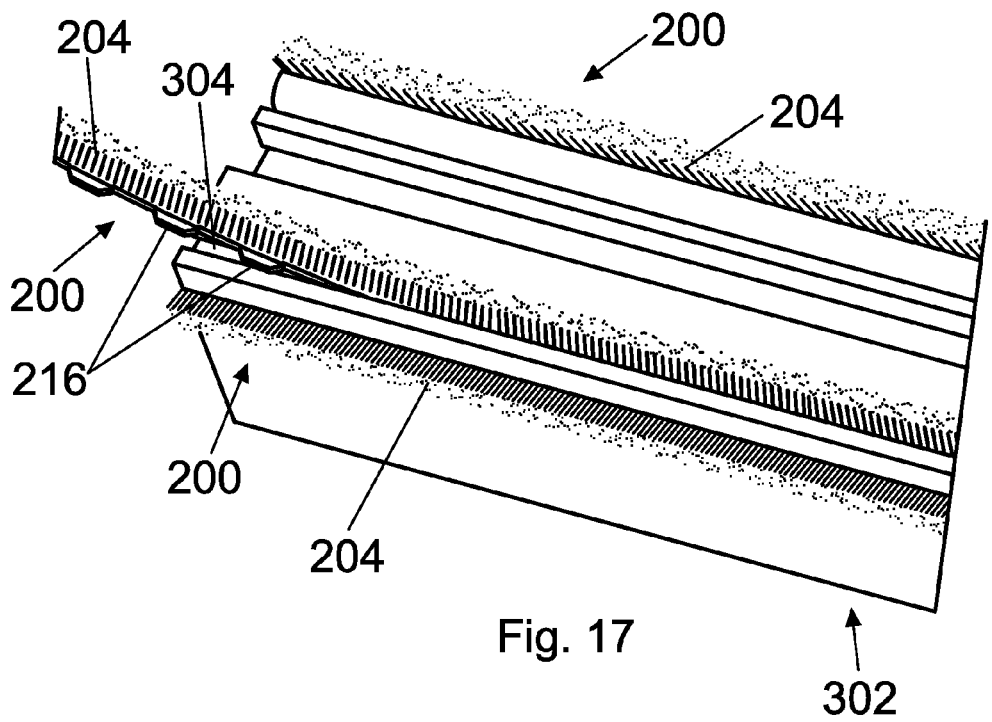
FIG. 17 is a perspective view of the frame depicted in FIG. 16 with the weatherstripping of FIG. 8 partially installed in one of the channels.
Figure 18:
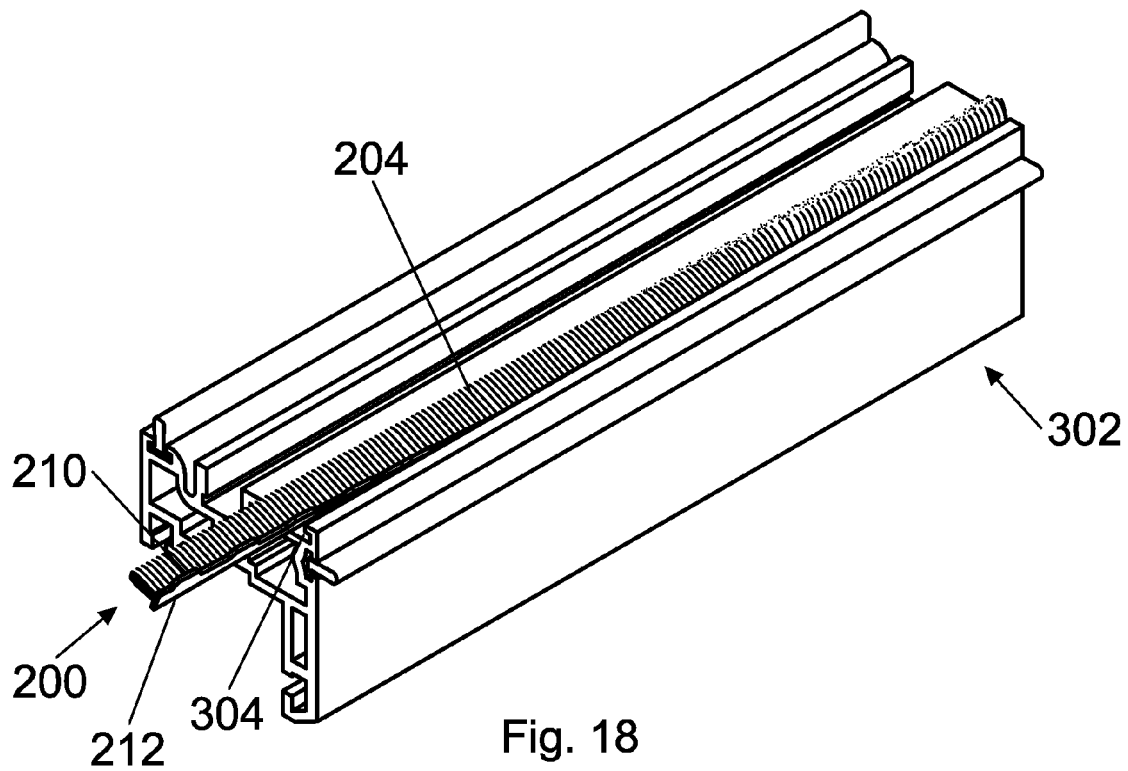
FIG. 18 is another perspective view of the frame defining a plurality of channels with the weatherstripping of FIG. 8 partially installed in one of the channels and the weatherstripping of FIG. 8 entirely installed in each of the other channels.
Figure 19:
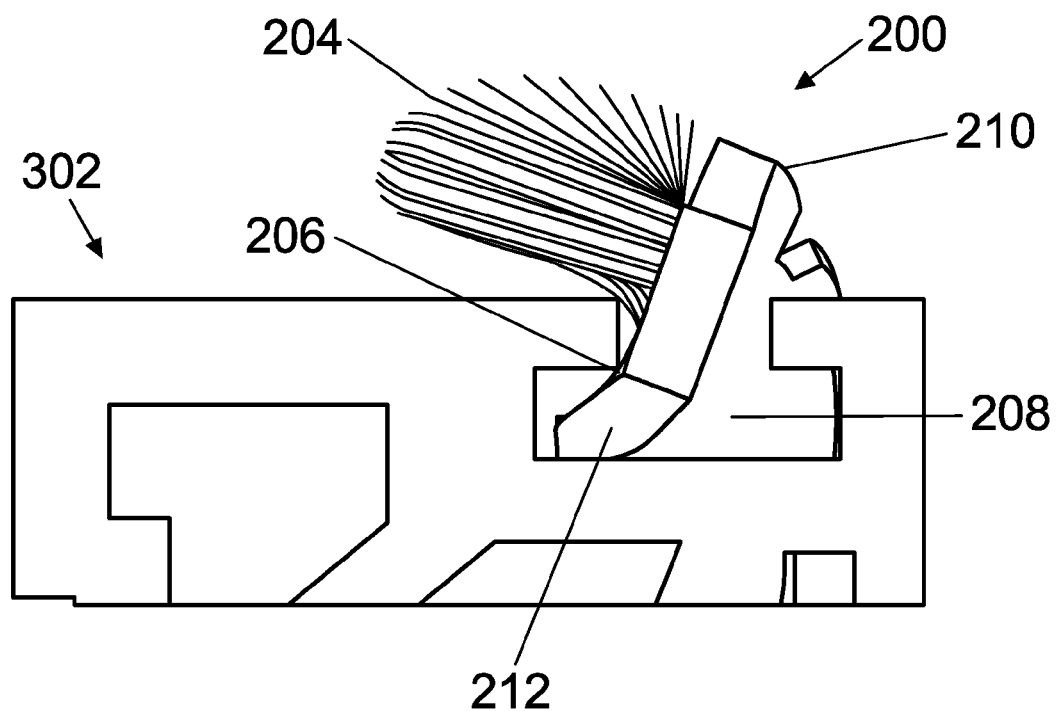
FIG. 19 is an end view of a portion of the frame with the weatherstripping of FIG. 8 partially installed in one of the channels.
Figure 20:
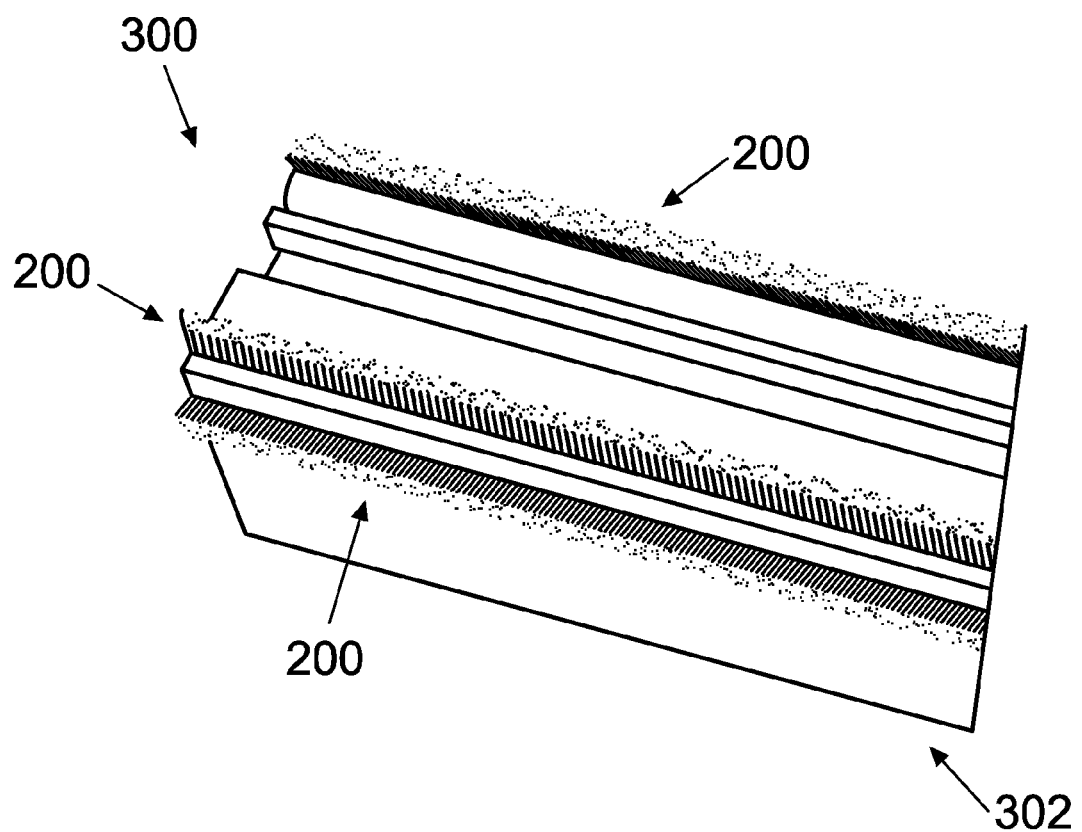
FIG. 20 is a perspective view of the frame defining a plurality of channels with a weatherstripping of FIG. 8 installed in each of the channels.

As shown in FIGS. 14-20, the method includes inserting the second side edge 212 of the backing 202 into the channel 304 such that the plane P of the second side edge 212 is parallel to the channel axis A. The method further includes inserting each of the alternating tabs 216 into the channel 304 so that the entire first side edge 210 is inserted within the channel 304. Typically, the second side edge 212 of the backing 202 is inserted into the channel 304 before the alternating tabs 216 are inserted into the channel 304. In one example, the entire length of the second side edge 212 is inserted into the channel 304 before any of the alternating tabs 216 are inserted into the channel. In another example, and as shown, a first portion of the second side edge 212 is inserted into the channel 304 followed by at least one tab 216 located opposite the first portion of the second side edge 212 (for example, as shown in FIGS. 14 and 15), then a second portion of the second side edge 212 is inserted into the channel 304 followed by at least one tab 216 opposite the second portion of the second side edge 212 (for example, as shown in FIGS. 16 and 17), and then a then a third portion of the second side edge 212 into the channel 304 following by at least one tab 216 opposite the third portion of the second side edge 212 (for example, as shown in FIG. 18), and so on until the weatherstripping 200 is completely installed in the channel 304 (for example, as shown in FIG. 20). It is to be understood, however, that the weatherstripping 200 may be installed into the channel 304 by inserting as many portions of the second side edge 212, and corresponding tab(s) 216, as desired until the weatherstripping 200 is entirely installed into the channel 304.

The second side edge 212 may be inserted by simply placing the second side edge 212 through the opening 306 and into the channel 304. The portion of the central support 214 with the second side edge 212 is then nestled inside the channel 304 underneath the first lip 308 partially defining the channel 304. This is best shown in FIGS. 18 and 19. The alternating tabs 216 may be inserted by sequentially snapping each of the tabs 216 into the channel 304. When a tab 216 is snapped into the channel 304, the tab 216 bends or slightly deforms so that the tab 216 can pass through the opening 306 and then snap into place inside the channel 304. The tab 216 with the first side edge 210 is then nestled underneath the second lip 310 partially defining the channel 304. Snapping of the tabs 216 may be accomplished by pushing the tab 216 toward the channel 304 so that the tab 216 passes through the opening 306. Pushing may be accomplished, for example, by applying pressure to the tab 216 utilizing a person's finger and/or a tool.

As previously mentioned, the weatherstripping 200 is flexible in the x-direction. This flexibility enables twisting of the central support 214 about the central axis A while sequentially snapping each of the tabs 216 into the channel 304. For instance, the central support 214 is positioned so that a first portion of the second side edge 212 can be inserted into the channel 304 (as shown, for example, in FIG. 13). After the first portion of the second side edge 212 is inserted into the channel 304, the central support 214 may be twisted so that the tabs 216 opposite from the first portion of the second side edge 212 can be inserted (e.g. snapped) into the channel 304. After a second portion of the second side edge 212 is inserted into the channel 304, the central support 214 is twisted again when the tabs 216 opposite from the second portion of the second side edge 212 are inserted into the channel 304. Accordingly, during installation, the weatherstripping 200 (e.g. the central support 214) is sequentially twisted as the tabs 216 are sequentially inserted into the channel 304. An illustration of the twisting of the central support 214 is shown in FIG. 19.

The weatherstripping 200 described in detail above may be easily installed into the channel 304 of the frame 302. It is to be understood that the weatherstripping 200 may also be easily removed from the channel 304. Removal of the weatherstripping 200 may be accomplished by grasping the weatherstripping 200 (such as by using a person's hand or using a tool such as a pair of pliers, etc.) and pulling the weatherstripping 200 so that the tabs 216 sequentially deform and pass through the opening 306 and snap outside of the channel 304.

As shown in FIG. 20, the weatherstripping 200 is entirely installed in the channel 304 and forms the assembly 300. Typically, when the weatherstripping 200 is entirely installed in the channel 304 which is substantially straight, the first 210 and second 212 side edges of the backing 202 are also substantially straight. Additionally, excess weatherstripping 200 may be removed from the end of the channel 304. Typically, the excess weatherstripping 200 is removed, such as by cutting the excess weatherstripping 200 off utilizing a knife, a scissors, or another suitable tool.

Several embodiments and examples of the weatherstripping 101, 200 have been described above. It is believed that one could envision variations of the weatherstripping 101, 200 that are not specifically described above. For instance, the tab width $W_{TAB}$ of the alternating tabs 216 may not necessarily be consistent along the entire backing length $L_{BACKING}$, or the bottom length $L_{BOTTOM}$ of the notched out spaces 218 may not necessarily be consistent along the entire backing length $L_{BACKING}$. Furthermore, the embodiments of the weatherstripping 101, 200 have been described above for use with fenestration products such as doors and windows for cars, buildings, etc. It is to be understood that the weatherstripping 101, 200 may also be used in other applications such as car trunks, t-tops, convertible tops, and the like, various boat components, or in any application where a weatherstripping 101, 200 may be applied.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. An assembly comprising:
    a frame defining at least one channel;
    a backing inserted within said channel, said backing having a front surface, a bottom surface opposite said front surface, a first side edge, a second side edge opposite said first side edge, a central support defining a central axis, and a plurality of alternating tabs extending from said central support to said first side edge to define notched out spaces between said alternating tabs, with said second side edge defining a plane that is parallel to said central axis of said central support; and
    a weatherstripping material coupled to said backing and extending from said front surface of said backing.

2. The assembly as set forth in claim 1 wherein said first and second side edges are substantially straight when said backing is inserted within said channel.

3. The assembly as set forth in claim 1 wherein said frame includes a plurality of channels, and further including a plurality of backings with each of said backings including a weatherstripping material with one of said backings inserted within a respective one of said channels.

4. The assembly as set forth in claim 1 wherein said central axis and said first side edge define a first width and said central axis and said second side edge define a second width, and wherein said first and second widths are substantially equal.

5. The assembly as set forth in claim 4 wherein said backing has a backing length and said first and second widths are consistent along said backing length of said backing.

6. The assembly as set forth in claim 1 wherein each of said alternating tabs has first and second sloped sides each coupled to said central support at a predefined obtuse angle.

7. The assembly as set forth in claim 1 wherein said backing has a backing length and each of said alternating tabs has first and second sloped sides coupled to said central support and has a tab width extending between said first and second sloped sides, and wherein said tab width of said alternating tabs is consistent along said backing length.

8. The assembly as set forth in claim 1 wherein said backing has a backing length and each of said alternating tabs has first and second sides with respective first and second ends coupled to said central support, and each of said notched out spaces has a bottom edge defined between said first end of one of said alternating tabs and said second end of an adjacent one of said alternating tabs with said bottom edge having a bottom length, and wherein said bottom length of said notched out spaces is consistent along said backing length.

9. The assembly as set forth in claim 1 wherein said weatherstripping material is further defined as a pile of fiber segments.

10. The assembly as set forth in claim 1 wherein said weatherstripping material comprises polypropylene.

11. A weatherstripping for use with a frame having at least one channel, said weatherstripping comprising:
   a backing formed of a polymer having a front surface, a bottom surface opposite said front surface, a first side edge, a second side edge opposite said first side edge, a central support defining a central axis, and a plurality of alternating tabs extending from said central support to said first side edge to define notched out spaces between said alternating tabs for insertion within the channel of the frame, with said second side edge defining a plane that is parallel to said central axis of said central support; and
   a weatherstripping material coupled to said backing and extending from said front surface of said backing.

12. The weatherstripping as set forth in claim 11 wherein said central axis and said first side edge define a first width and said central axis and said second side edge define a second width, and wherein said first and second widths are substantially equal.

13. The weatherstripping as set forth in claim 12 wherein said backing has a backing length and said first and second widths are consistent along said backing length of said backing.

14. The weatherstripping as set forth in claim 11 wherein each of said alternating tabs has first and second sloped sides each coupled to said central support at a predefined obtuse angle.

15. The weatherstripping as set forth in claim 11 wherein said backing has a backing length and each of said alternating tabs has first and second sloped sides coupled to said central support and has a tab width extending between said first and second sloped sides, and wherein said tab width of said alternating tabs is consistent along said backing length.

16. The weatherstripping as set forth in claim 11 wherein said backing has a backing length and each of said alternating tabs has first and second sides with respective first and second ends coupled to said central support, and each of said notched out spaces has a bottom edge defined between said first end of one of said alternating tabs and said second end of an adjacent one of said alternating tabs with said bottom edge having a bottom length, and wherein said bottom length of said notched out spaces is consistent along said backing length.

17. A method of installing a weatherstripping into a frame defining at least one channel extending along a channel axis with the weatherstripping having a backing having a backing length and a weatherstripping material extending from the backing along the backing length, the backing having first and second opposed side edges with the second side edge having a plane, and the backing further having a central support and a plurality of alternating tabs extending from the central support to the first side edge, with said method comprising the steps of:
   aligning the second side edge of the backing with the channel of the frame along the channel axis;
   inserting the second side edge into the channel such that the plane of the second side edge is parallel to the channel axis; and
   inserting each of the alternating tabs into the channel so that the entire first side edge is inserted within the channel.

18. The method as set forth in claim 17 wherein the step of inserting each of the alternating tabs into the channel includes sequentially snapping each of the alternating tabs into the channel.

19. The method as set forth in claim 18 wherein the central support has a central axis and the step of inserting each of the alternating tabs into the channel further includes twisting the central support about the central axis while sequentially snapping each of the alternating tabs into the channel.

* * * * *